US008827596B2

(12) United States Patent
Chiodini et al.

(10) Patent No.: US 8,827,596 B2
(45) Date of Patent: Sep. 9, 2014

(54) HOISTING METHOD AND ASSEMBLY FOR ABANDONING AND/OR RECOVERING AN UNDERWATER PIPELINE FROM A LAYING VESSEL, AND LAYING VESSEL EQUIPPED WITH SUCH A HOISTING ASSEMBLY

(75) Inventors: Carlo Chiodini, Maniago (IT); Liborio Moceri, Cherisy (FR); Emmanuel Huot, St. Martin de Nigelles (FR)

(73) Assignee: Saipem S.p.A., San Donato Milanese (IT)

( * ) Notice: Subject to any disclaimer, the term of this patent is extended or adjusted under 35 U.S.C. 154(b) by 173 days.

(21) Appl. No.: 13/497,823

(22) PCT Filed: Sep. 27, 2010

(86) PCT No.: PCT/IB2010/002403
§ 371 (c)(1),
(2), (4) Date: Aug. 2, 2012

(87) PCT Pub. No.: WO2011/036547
PCT Pub. Date: Mar. 31, 2011

(65) Prior Publication Data
US 2013/0051921 A1    Feb. 28, 2013

(30) Foreign Application Priority Data

Sep. 25, 2009    (IT) ............... MI2009A1639

(51) Int. Cl.
*F16L 1/12*      (2006.01)
(52) U.S. Cl.
USPC ......................................... 405/173; 405/158

(58) Field of Classification Search
CPC ............... F16L 1/12; F16L 1/16; F16L 1/166; F16L 1/18; F16L 1/19; F16L 1/202; F16L 1/207; F16L 1/235; B63B 35/03; B63B 27/08
USPC ................................ 405/158, 166, 173, 184.4
See application file for complete search history.

(56) References Cited

U.S. PATENT DOCUMENTS

| 4,457,424 | A | * | 7/1984 | Wuensch ................ 198/747 |
| 5,951,227 | A | | 9/1999 | Calkins |
| 2005/0265788 | A1 | | 12/2005 | Renkema |
| 2007/0177944 | A1 | | 8/2007 | Smith et al. |

(Continued)

FOREIGN PATENT DOCUMENTS

| EP | 0 312 336 A1 | 4/1989 |
| EP | 1 850 043 A2 | 10/2007 |

(Continued)

OTHER PUBLICATIONS

International Search Report and Written Opinion for International Appl. No. PCT/IB2010/002403, European Patent Office, The Netherlands, mailed on Jan. 24, 2011, 11 pages.

*Primary Examiner* — Benjamin Fiorello
(74) *Attorney, Agent, or Firm* — Sterne, Kessler, Goldstein & Fox P.L.L.C.

(57) ABSTRACT

A method of abandoning or recovering an underwater pipeline from a laying vessel includes the steps of looping a first rope about a pulley connected to the free end of the pipeline; end-locking the first rope, on one side, to the laying vessel; and winding or unwinding the first rope, on the other side, by means of a first winch located on the laying vessel.

17 Claims, 5 Drawing Sheets

(56) References Cited

U.S. PATENT DOCUMENTS

| | | | |
|---|---|---|---|
| 2008/0251258 A1* | 10/2008 | Bamford | 166/355 |
| 2010/0266371 A1* | 10/2010 | Roodenburg et al. | 414/142.8 |
| 2011/0182671 A1* | 7/2011 | Roodenburg et al. | 405/166 |
| 2011/0260126 A1* | 10/2011 | Willis | 254/283 |
| 2011/0262229 A1* | 10/2011 | Tame | 405/166 |
| 2012/0269579 A1* | 10/2012 | Ardavanis | 405/166 |

FOREIGN PATENT DOCUMENTS

| | | |
|---|---|---|
| GB | 2 456 626 A | 7/2009 |
| WO | WO 2007/108673 A1 | 9/2007 |
| WO | WO 2009/002142 A1 | 12/2008 |
| WO | WO 2009/082191 A1 | 7/2009 |

* cited by examiner

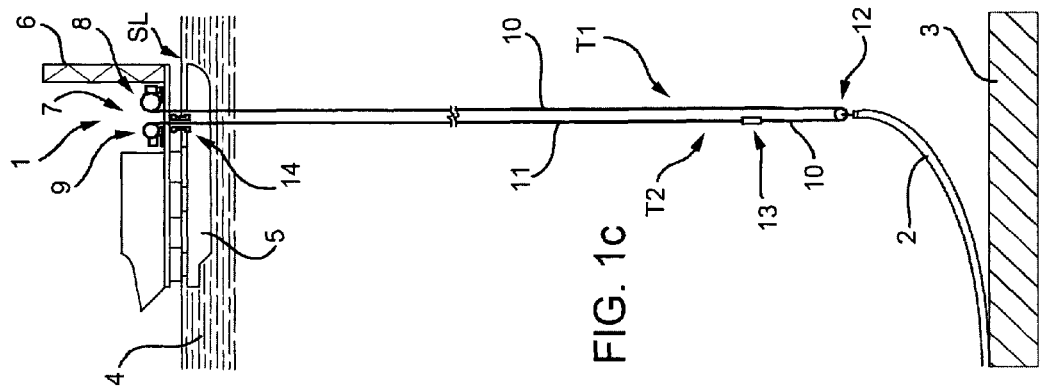
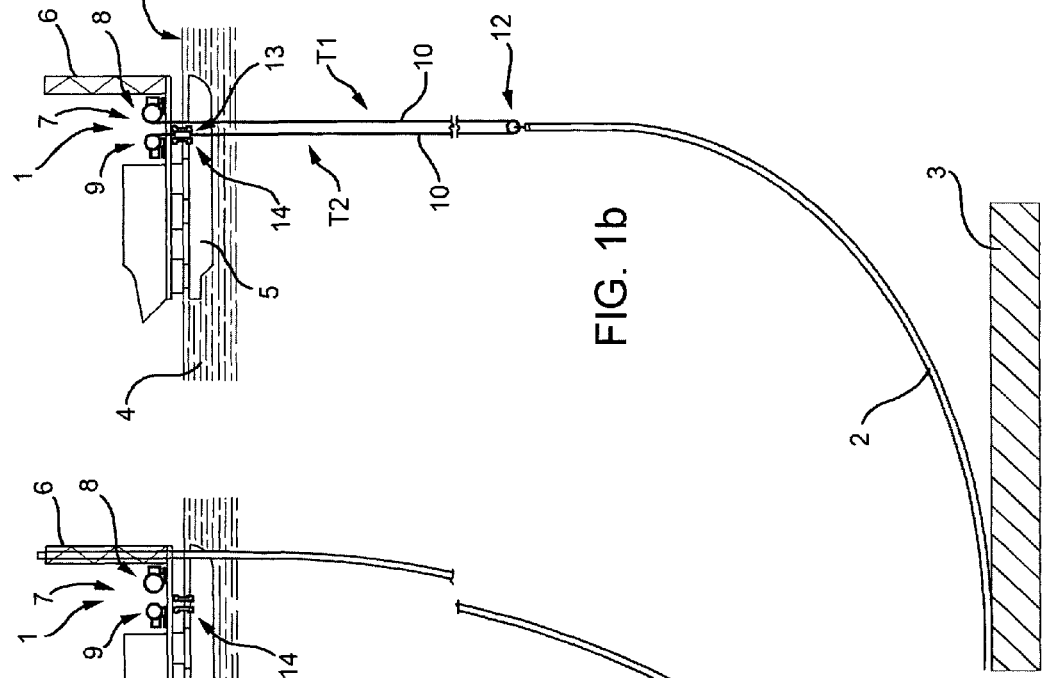
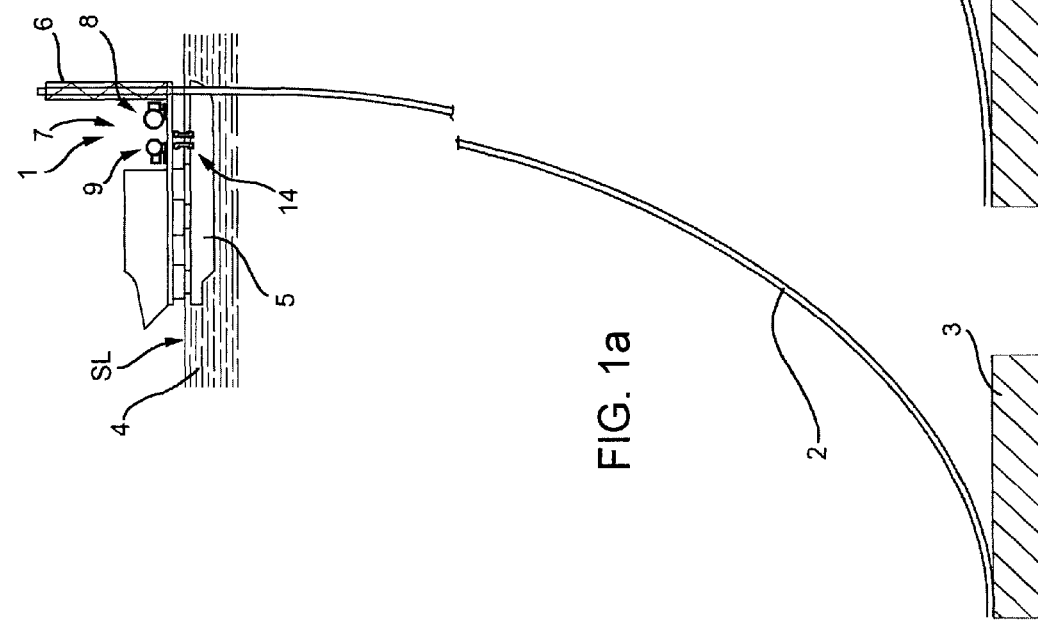

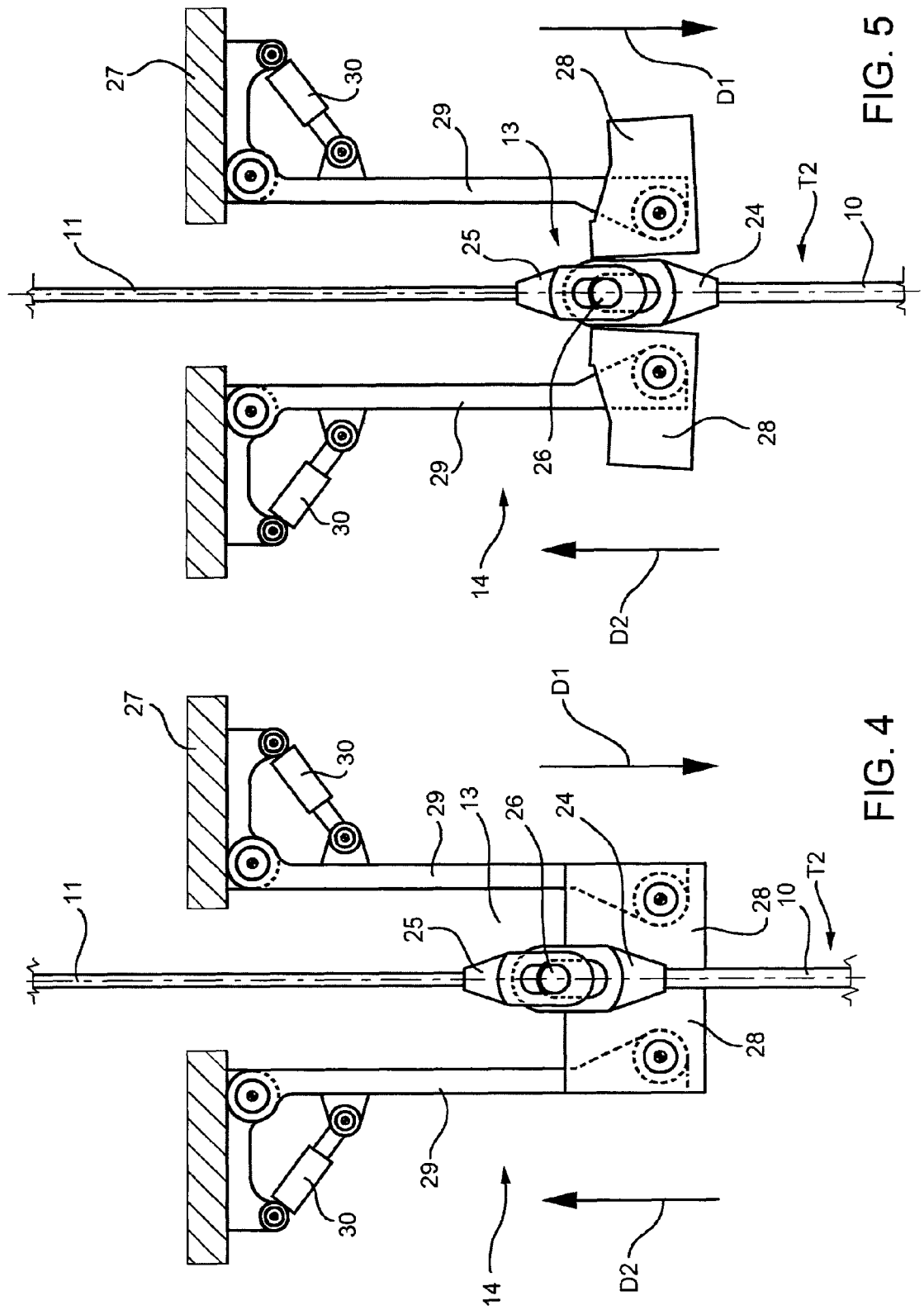

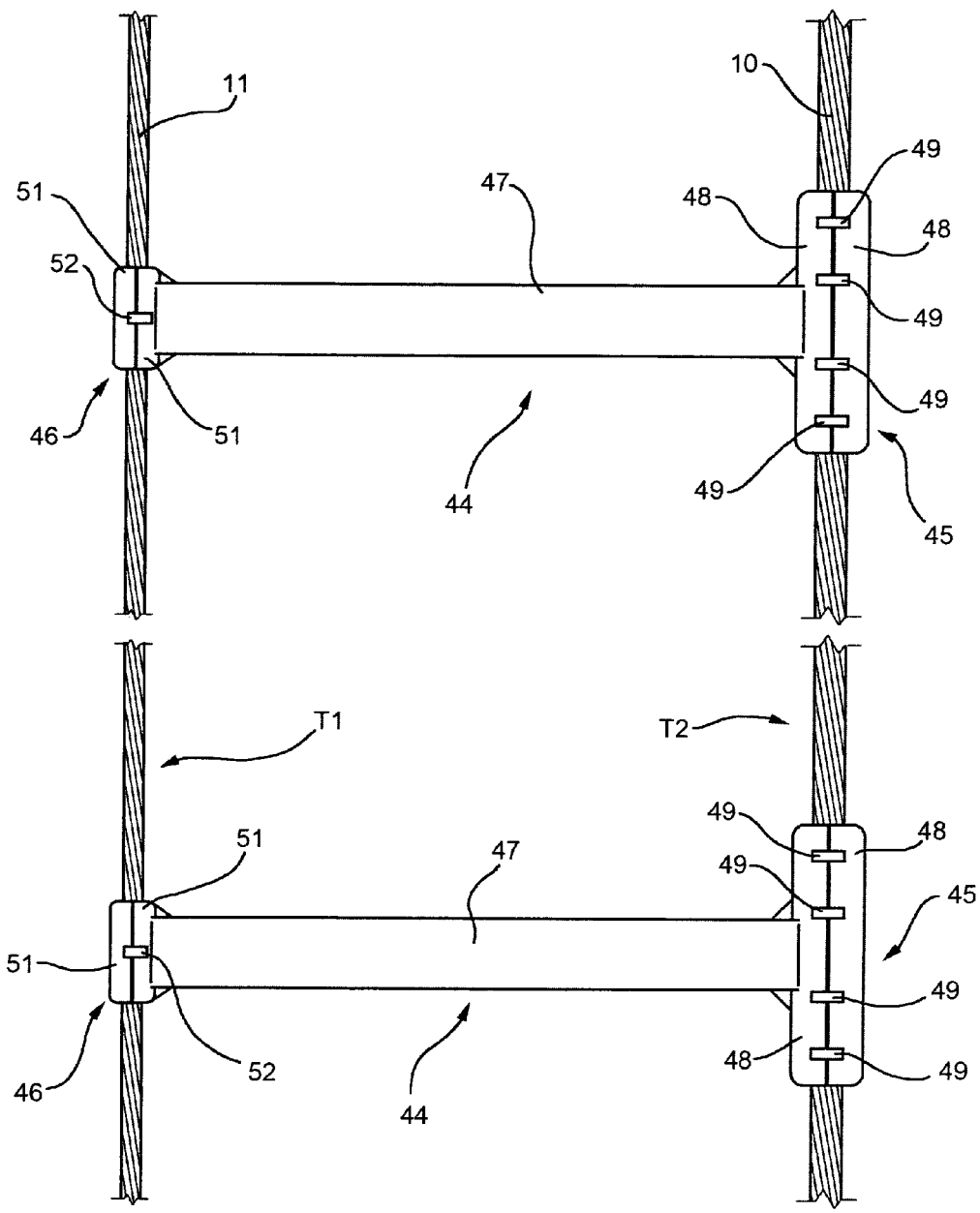
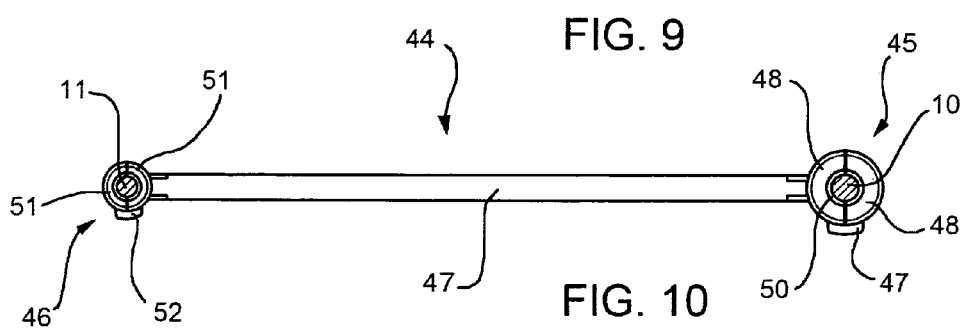
FIG. 9
FIG. 10

HOISTING METHOD AND ASSEMBLY FOR ABANDONING AND/OR RECOVERING AN UNDERWATER PIPELINE FROM A LAYING VESSEL, AND LAYING VESSEL EQUIPPED WITH SUCH A HOISTING ASSEMBLY

TECHNICAL FIELD

The present invention relates to a method of abandoning and/or recovering an underwater pipeline from a laying vessel.

BACKGROUND ART

An underwater pipeline is normally assembled on board a laying vessel, and laid on the bed of a body of water as it is assembled. Some commonly used laying vessels are equipped with a substantially horizontal, on-board assembly line; and a curved lay ramp that guides part of the pipeline as it is lowered onto the bed. This laying method is known as S-laying, because of the shape of the pipeline between the laying vessel and the bed.

On other laying vessels, the pipeline is assembled in a substantially vertical tower and released substantially vertically. This laying method is known as J-laying, because of the shape of the pipeline between the laying vessel and the bed, and is preferable to S-laying when working in deep water.

Substantially two situations make it necessary to abandon the pipeline on the bed: bad weather conditions making laying work dangerous; and completion of the pipeline.

The pipeline must be recovered off the bed to resume laying and assembly work interrupted by bad weather.

Methods of abandoning and/or recovering underwater pipelines comprise shutting down assembly of the pipeline; connecting the free end of the pipeline to a hoisting assembly comprising at least one winch on the laying vessel, at least one rope, and a connecting device for connecting the rope to the pipeline; and abandoning/recovering the pipeline by winching out/up the rope. Documents EP 1,850,043 A2; US 2007/0177944; WO 2009/002142; and WO 2009/082191 describe various abandoning and/or recovery methods, which employ hoisting assemblies comprising two winches installed on board the laying vessel and operating synchronously to simultaneously control two ropes and share the load exchanged between the pipeline and the laying vessel.

The load between the laying vessel and the pipeline varies between a maximum and minimum, and depends on the length of pipeline raised off the bed. When abandoning the pipeline, load is maximum at the initial stage, when a long portion of the pipeline is raised off the bed. And, conversely, when recovering the pipeline, load is maximum at the final stage, when, again, a long portion of the pipeline is raised off the bed.

The load between the pipeline and the laying vessel, in fact, is a function of the weight per linear meter of the pipeline, and the length of pipeline raised off the bed.

Whether it comprises one or more winches, the hoisting assembly must have a total capacity greater than the actually short-lived maximum load between the pipeline and the laying vessel. Which means the laying vessel as a whole must be equipped with a hoisting assembly capable of hoisting more than the maximum load exchangeable between the pipeline and the vessel. Deepwater laying vessels, normally equipped with a J-lay tower, must therefore be equipped with hoisting assemblies of over 1500-ton capacity when working with extra-large-diameter pipelines; and even a 1500-ton hoisting capacity may not always be enough when abandoning extra-large-diameter pipelines in deep water.

To solve the problem, U.S. Pat. No. 6,729,802 filed by the Applicant proposes connecting the end of the pipeline to floating bodies to reduce the load between the pipeline and the laying vessel. This has proved highly successful, but is slow when the pipeline has to be abandoned rapidly in particularly bad weather conditions.

DISCLOSURE OF INVENTION

It is an object of the present invention to provide a method of abandoning or recovering an underwater pipeline from a laying vessel, designed to eliminate the drawbacks of the known art.

Another object of the present invention is to provide a method of abandoning or recovering an underwater pipeline, even when hoisting capacity is to some extent less than that of the hoisting assembly.

According to the present invention, there is provided a method of abandoning or recovering an underwater pipeline from a laying vessel, the method comprising the steps of looping a first rope about a pulley connected to the free end of the pipeline; end-locking the first rope, on one side, to the laying vessel; and winding or unwinding the first rope, on the other side, by means of a first winch located on said laying vessel and having a first hoisting capacity.

The present invention provides for both abandoning and recovering an underwater pipeline using a first winch with a first hoisting capacity substantially equal to half the total load between the pipeline and the laying vessel.

In a preferred embodiment of the present invention, the first rope is joined, on one side, to a second rope operated by a second winch located on the laying vessel and having a second hoisting capacity lower than the first hoisting capacity. And the method comprises the steps of selectively end-locking the first rope to the laying vessel; and selectively releasing the first rope from the laying vessel, to abandon or recover the pipeline using the first and second rope jointly, by unwinding or winding the first and second rope by means of the first and second winch respectively.

The preferred embodiment enables fast switching from the end-locked first rope configuration, in which the second winch and second rope are idle, to the joint configuration of the first and second rope operated respectively by the first and second winch. Because the load between the laying vessel and the pipeline is maximum at the initial stage when abandoning the pipeline, the pipeline is initially abandoned using the first winch with the first rope end-locked, and then using the first and second winch and the first and second rope jointly, to speed up descent of the pipeline.

When recovering the pipeline, on the other hand, the pipeline is first hoisted using the first and second winch and the first and second rope jointly, and finally using the first winch with the first rope end-locked.

The above is also achieved even when the total hoisting capacity of the first and second winch is less than the maximum load between the pipeline and the laying vessel.

Another object of the present invention is to provide a hoisting assembly for abandoning and/or recovering an underwater pipeline from a laying vessel, and designed to eliminate the drawbacks of the known art.

According to the present invention, there is provided a hoisting assembly for abandoning or recovering an underwater pipeline from a laying vessel, as claimed in claim 11. More specifically, the hoisting assembly comprises at least a first winch with a first hoisting capacity; a first rope operated by the first winch; a connecting device, which attaches to the pipeline and has a pulley for guiding the first rope; and a coupling device located on the laying vessel to end-lock the first rope to the laying vessel, and to at least partly abandon or recover the pipeline using the end-locked first rope and the first winch.

BRIEF DESCRIPTION OF THE DRAWINGS

A number of non-limiting embodiments of the present invention will be described by way of example with reference to the accompanying drawings, in which:

FIGS. 1a-1c show side views of three operating stages of a laying vessel equipped with a hoisting assembly in accordance with the present invention;

FIGS. 4 and 5 show two larger-scale side views, with parts removed for clarity, of a coupling device in accordance with the present invention;

FIG. 9 shows a larger-scale side view, with parts removed for clarity, of a spacer device;

FIG. 10 shows a plan view, with parts removed for clarity, of the FIG. 9 spacer device.

BEST MODE FOR CARRYING OUT THE INVENTION

Figure 2:
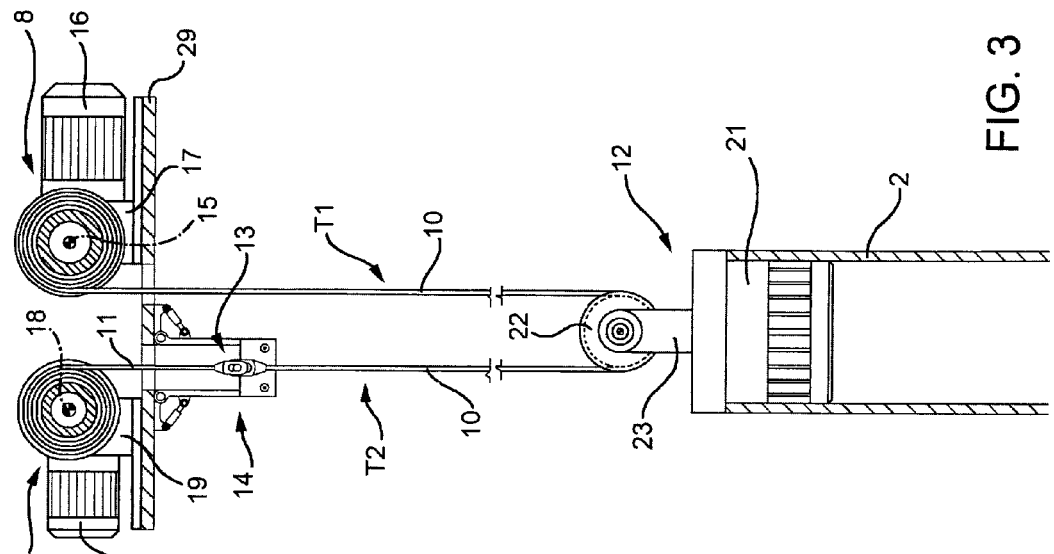
FIGS. 2 and 3 show two larger-scale side views, with parts removed for clarity, of two steps in the pipeline abandoning method according to the present invention.

Number 1 in FIG. 1a indicates as a whole a laying vessel assembling and laying an underwater pipeline 2 on the bed 3 of a body of water 4 of level SL.

In the example shown, laying vessel 1 comprises a floating structure 5; a J-lay tower 6; and a hoisting assembly 7 for abandoning and recovering pipeline 2.

FIG. 1a shows the pipeline being assembled in J-lay tower 6 and gradually released by gripping assemblies (not shown) associated with tower 6 and for gripping pipeline 2.

When completed, or in bad weather, pipeline 2 must be abandoned on bed 3.

The abandoning method comprises connecting the free end of pipeline 2 to hoisting assembly 7; and easing pipeline 2 onto bed 3. As shown in FIGS. 1b and 1c, as the abandoning operation proceeds, the portion of pipeline 2 detached from bed 3 and, hence, the load between pipeline 2 and laying vessel 1 get smaller, which means the maximum load between laying vessel 1 and pipeline 2 occurs at the initial stage in abandoning pipeline 2.

To resume laying work, the abandoned pipeline 2 must be recovered. This is done using hoisting assembly 7 connected to pipeline 2; and the maximum load between pipeline 2 and laying vessel 1 occurs at the final recovery stage.

Figure 3:
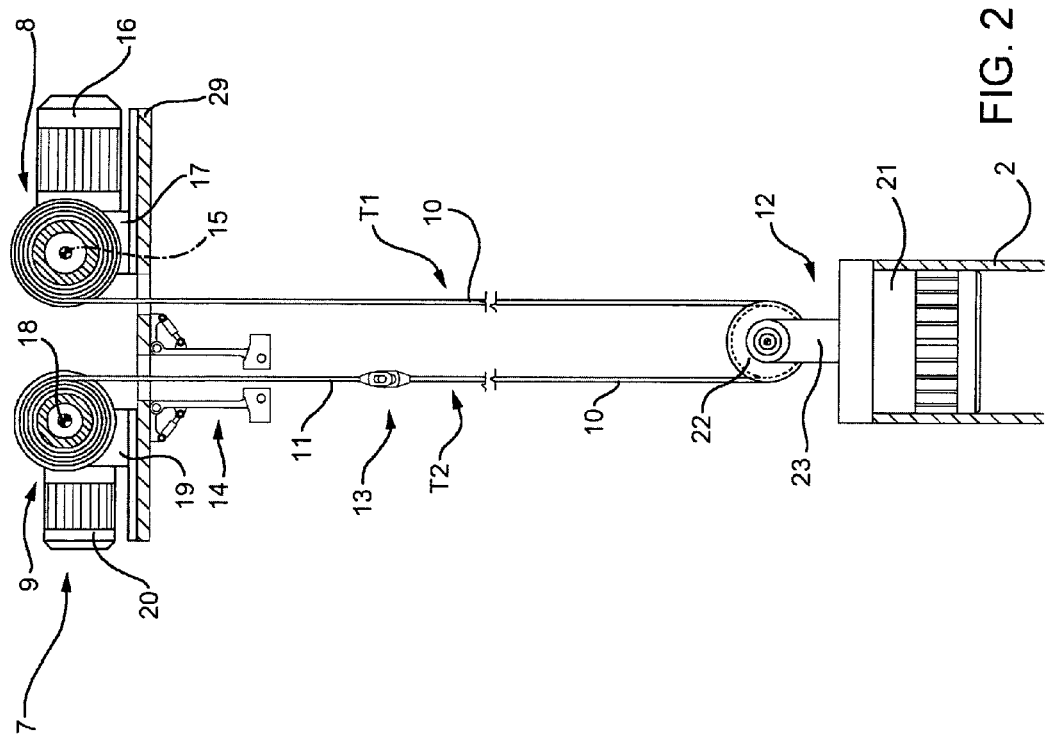

With reference to FIGS. 2 and 3, hoisting assembly 7 comprises two winches 8 and 9; two ropes 10 and 11; a connecting device 12 for connecting ropes 10 and 11 to the free end of pipeline 2; a splicing device 13 for joining ropes 10 and 11; and a coupling device 14 for connecting rope 10 to laying vessel 1.

Winch 8 is mounted on laying vessel 1, and comprises a drum 15 for winding and unwinding rope 10; a motor 16; and a reducer 17. Winch 9 is mounted on the laying vessel, and comprises a drum 18 for winding and unwinding rope 11; a motor 19; and a reducer 20. Winch 8 has a greater hoisting capacity than winch 9, so rope 10 is larger in diameter than rope 11. Ropes 10 and 11 are steel-stranded, low-twist, anti-rotation ropes designed for the hoisting capacities of respective winches 8 and 9.

Connecting device 12 comprises a plug 21 for plugging the free end of pipeline 2; and a pulley 22—in the example shown, an idle pulley—that rotates on a fork 23 integral with plug 21.

With reference to FIGS. 4 and 5, splicing device comprises two terminals 24 and 25 integral with respective ropes 10 and 11; and a pin 26 connecting terminals 24 and 25. Splicing device 13 as a whole comprises two opposite conical portions at terminals 24 and 25; and a central portion fitted with pin 26.

Coupling device 14 is mounted on laying vessel 1—preferably suspended from a deck 27 of laying vessel 1—and comprises two jaws 28, which automatically grip splicing device 13 as it runs between jaws 28 in a direction D1. In the example shown, coupling device 14 comprises two arms 29 for supporting jaws 28 and hinged to deck 27; and two actuators 30 for selectively rotating arms 29 about their respective hinge axes. Jaws 28 form a conical seat complementary to the conical portion of splicing device 13, so as to form a wedge-type joint when splicing device 13 is loaded in direction D1, and arms 29 are positioned as shown in FIGS. 4 and 5. Jaws 28 are mounted to rotate with respect to arms 29, so that, when the splicing device runs between jaws 28 in a direction D2 opposite direction D1, jaws 28 rotate about their respective axes with respect to arms 29 to let splicing device 13 through, as shown in FIG. 5. Splicing device 13 is released from jaws 28 by lifting it in direction D2, and parting arms 29 using actuators 30, so that splicing device 13 runs freely between jaws 28 in direction D1.

Hoisting assembly 7 also comprises connecting devices (not shown) for connecting rope 10 or rope 11 only to pipeline 2, so winches 8 and 9 can each be operated singly (i.e. without pulley 22) when the load between pipeline 2 and laying vessel 1 and the hoisting capacities of individual winches 8 and 9 allow.

Hoisting assembly 7 described is designed to operate in a number of modes. More specifically, in addition to the operating modes in which each winch 8, 9 operates fully independently of the other (single operating mode), hoisting assembly 7 also permits an operating mode in which ropes 10 and 11 are joined, run about pulley 22, and are wound or unwound by respective winches 8 and 9, so the load between pipeline 2 and laying vessel 1 is divided equally between two parallel portions T1 and T2 extending from pulley 22 to winches 8 and 9.

In another operating mode, rope 10, i.e. splicing device 13, is connected to laying vessel 1, and is wound or unwound in an end-locked configuration, in which rope 10 forms about pulley 22 an open loop with two portions T1, T2 extending between pulley 22 and the laying vessel, as shown in FIG. 1b. The total load is thus divided equally between two substantially parallel portions T1, T2 of rope 10; portion T2 being connected directly to laying vessel 1, and portion T1 being wound or unwound by winch 8. Winch 8 can thus control pipeline 2 when the load between the pipeline and laying vessel 1 is substantially twice the hoisting capacity of winch 8.

Coupling device 14 provides for switching rapidly between operating winch 8 with rope 10 end-locked, and operating both winches 8 and 9 to wind or unwind ropes 10 and 11 jointly. In the joint configuration, the open loop comprising portions T1 and T2 is formed partly by rope 10 and partly by rope 11. Operating winch 8 on its own with rope 10 end-locked enables loads of substantially twice the hoisting capacity of winch 8 to be handled, but abandoning and recovery speed is half that of both winches 8 and 9 operating ropes 10 and 11 jointly.

The following are example operating modes of hoisting assembly 7, assuming winch 8 has a hoisting capacity of 750 tons, and winch 9 a hoisting capacity of 500 tons.

EXAMPLE 1

When the maximum load between pipeline 2 and laying vessel 1 is below 500 tons, the pipeline is abandoned and recovered using winch 9 and rope 11 in single mode.

EXAMPLE 2

When the maximum load between pipeline 2 and laying vessel 1 is between 500 and 750 tons, the pipeline is abandoned and recovered using winch 8 and rope 10 in single mode.

EXAMPLE 3

When the maximum load between pipeline 2 and laying vessel 1 is between 750 and 1000 tons, the pipeline is abandoned and recovered using winches 8 and 9 operating respective ropes 10 and 11 jointly. Winches 8 and 9 are operated simultaneously to wind or unwind respective ropes 10 and 11 as shown in FIG. 1c.

EXAMPLE 4

When the maximum load between pipeline 2 and laying vessel 1 is between 1000 and 1500 tons, the pipeline is abandoned and recovered using winch 8 on its own, with rope 10 end-locked to laying vessel 1, as shown in FIG. 1b. When abandoning pipeline 2, this configuration is maintained until the load falls below 1000 tons; at which point, hoisting assembly 7 is set to the EXAMPLE 3 configuration (FIG. 1c) to accelerate the abandoning operation and take advantage of the greater speed and depth achievable using both ropes 10 and 11 jointly. Ropes 10 and 11, in fact, are of limited length, and the end-locked configuration of rope 10 only reaches half the depth of rope 10 used in single mode, i.e. with its end connected directly to the free end of the pipeline.

Coupling device 14 provides for switching rapidly from the EXAMPLE 4 to the EXAMPLE 3 mode, and vice versa, by releasing splicing device 13 from coupling device 14, and connecting splicing device 13 to coupling device 14 respectively.

Figure 6:
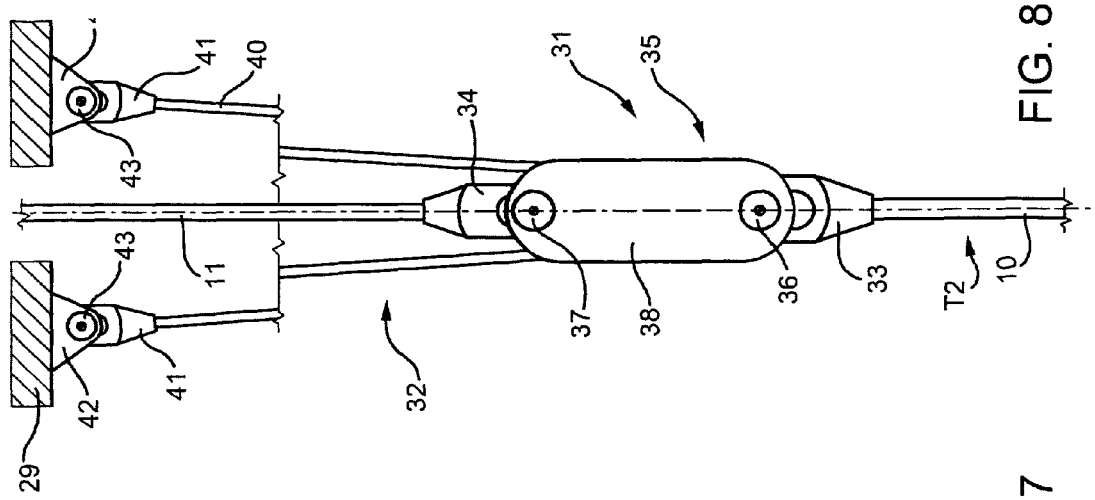
FIG. 6 shows a larger-scale, partly sectioned side view, with parts removed for clarity, of a variation of the FIGS. 4 and 5 coupling device.
Figure 7:
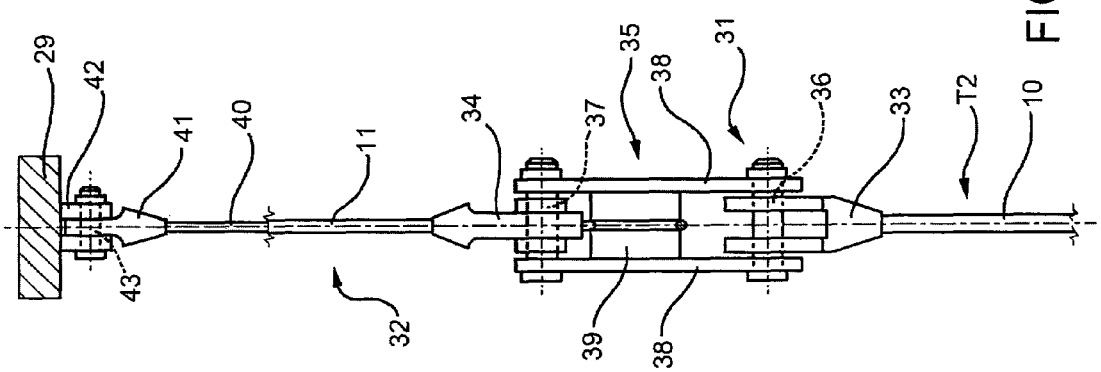
FIG. 7 shows a larger-scale front view, with parts removed for clarity, of the FIG. 6 coupling device.
Figure 8:
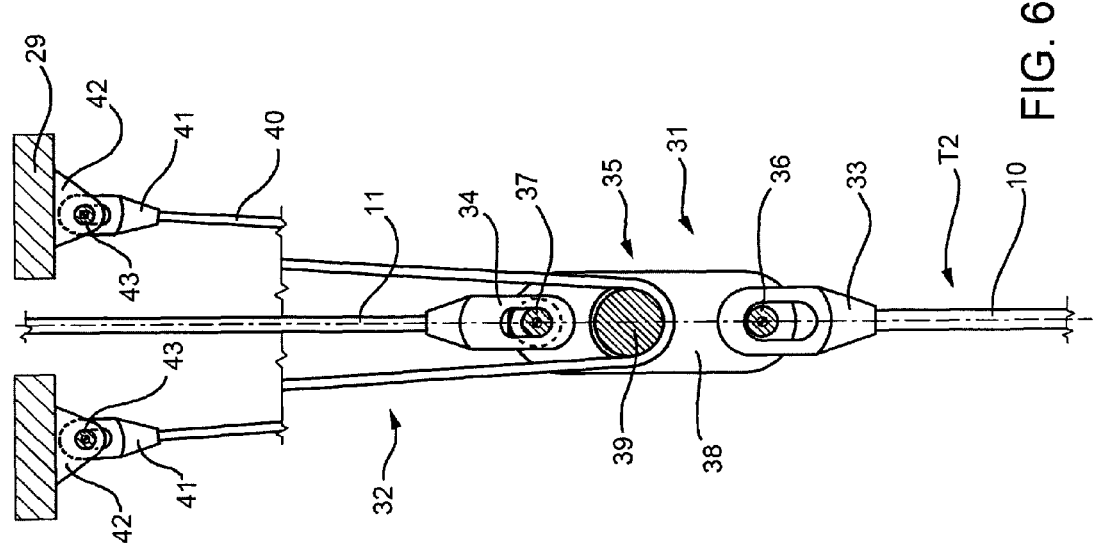
FIG. 8 shows a larger-scale side view, with parts removed for clarity, of the FIG. 6 coupling device.

In FIGS. 6 to 8, splicing device 13 and coupling device 14 in FIGS. 2 to 5 are replaced with a splicing device 31 and a coupling device 32.

Splicing device 31 comprises two terminals 33, 34; a fork 35; and two pins 36, 37. Fork 35 comprises two opposite plates 38, and a spacer 39 between and integral with plates 38.

Coupling device 32 comprises a rope 40 with two terminals 41; two eyelets 42 integral with deck 27; and two pins 43 fastening terminals 41 to eyelets 42.

In this variation, splicing device 31 is suspended from deck 27 by rope 40, which is run between plates 38 and about spacer 39, and fixed at the ends to eyelets 42.

With reference to FIGS. 9 and 10, hoisting assembly 7 also comprises a spacer device 44 for preventing contact and twisting of the two parallel portions T1, T2 connecting pulley 22 to winches 8 and 9. Spacer device 44 comprises an annular member 45; an annular member 46; and a spacer 47 connecting annular members 45 and 46. With reference to FIG. 10, annular member 45 grips portion T1, and comprises two hinged half-shells 48; fasteners 49; and a liner 50. Annular member 46 attaches loosely to portion T2, to permit low-friction, relative slide between annular member 46 and portion T2. As stated, portion T1 is defined by rope 10, while portion T2 may be defined by rope 10 and/or rope 11. Annular member 46 comprises two hinged half-shells 51; and a fastener 52 for selectively opening and closing half-shells 51. The half-shells are preferably lined with teflon or other friction-reducing material.

Even if winch 9 operates at a different speed from winch 8, spacer device 44 therefore does not prevent hoisting assembly 7 from operating with portions T1 and T2 at different speeds. Hoisting assembly 7, in fact, comprises a number of spacer devices 44, which are fixed at intervals along portions T1 and T2 as ropes 10 and 11 are lowered into water 4 (FIG. 1b and 1c), and, conversely, are removed from portions T1 and T2 as ropes 10 and 11 are raised from water 4 (FIGS. 1b and 1c).

In a variation not shown, the annular members of the spacer devices are adjustable in diameter, to adapt to ropes of different diameters.

Clearly, changes may be made to the present invention as described herein without, however, departing from the scope of the accompanying Claims.

The invention claimed is:

1. A method of abandoning or recovering an underwater pipeline from a laying vessel using a first winch located on the laying vessel having a first hoisting capacity and a second winch located on the laying vessel having a second hoisting capacity lower than the first hoisting capacity, the method comprising the steps of:
    looping a first rope about a pulley connected to the free end of the pipeline, wherein the first rope is joined, on a first side of the pulley, to a second rope operated by the second winch;
    selectively end-locking the first rope, on the first side, to the laying vessel;
    winding or unwinding the first rope, on a second side of the pulley, by means of the first winch; and
    selectively releasing the end-locking of the first rope from the laying vessel to abandon or recover the pipeline using the first and second ropes jointly, by unwinding or winding the first and second ropes by means of the first and second winches, respectively.

2. The method as claimed in claim 1, wherein the first and second ropes are joined by a splicing device; the step of selectively end-locking the first rope comprising selectively attaching the splicing device to the laying vessel; and the step of selectively releasing the end-locking of the first rope comprising selectively releasing the splicing device from the laying vessel.

3. The method as claimed in claim 2, comprising the step of automatically gripping the splicing device by means of a coupling device on the laying vessel, when the splicing device is located at the coupling device.

4. The method as claimed in claim 2, comprising the step of attaching the splicing device to the laying vessel by means of a coupling device comprising a further rope looped about the splicing device.

5. The method as claimed in claim 1, comprising the step of abandoning or recovering the pipeline using the first and second ropes jointly and driven by the first and second winches respectively, when the load between the pipeline and the laying vessel is less than twice the second hoisting capacity and higher than the first hoisting capacity.

6. The method as claimed in claim 1, comprising the step of abandoning or recovering the pipeline using the first rope end-locked to the laying vessel and driven by the first winch, when the load between the pipeline and the laying vessel is less than twice the first hoisting capacity and more than twice the second hoisting capacity.

7. The method as claimed in claim 1, wherein an open loop is formed about the pulley by the first rope when end-locked, and by the first and second ropes used jointly when the first rope is not end-locked; said open loop comprising first and second portions extending between the pulley and the laying vessel; and the method comprising the step of attaching spacer devices between the first and second portions, when abandoning the pipeline, to keep the first and second portions apart.

8. The method as claimed in claim 7, and comprising the steps of fixing the spacer devices to the first portion; and connecting the spacer devices in a sliding manner to the second portion as the first rope is unwound by the first winch.

9. The method as claimed in claim 7, and comprising the step of removing the spacer devices from the first portion and second portion, as the first rope is wound by the first winch.

10. A hoisting assembly for abandoning or recovering an underwater pipeline from a laying vessel, the hoisting assembly comprising:
at least a first winch with a first hoisting capacity; a first rope operated by the first winch; a connecting device, which attaches to the pipeline and has a pulley for guiding the first rope; and a coupling device located on the laying vessel to end-lock the first rope to the laying vessel, and to at least partly abandon or recover the pipeline using the end-locked first rope and the first winch; and
a second winch with a second hoisting capacity lower than the first hoisting capacity; a second rope operated by the second winch; and a splicing device for connecting an end of the first rope to an end of the second rope; the coupling device being designed to selectively attach the splicing device to the laying vessel to end-lock the first rope; and to release the splicing device from the laying vessel, to abandon or recover the pipeline by unwinding or winding the first and second ropes jointly, by means of the first and second winch respectively.

11. The hoisting assembly as claimed in claim 10, wherein the coupling device and the splicing device together form a wedge-type joint, when the splicing device is drawn in a first direction with respect to the coupling device.

12. The hoisting assembly as claimed in claim 11, wherein the coupling device comprises jaws defining a seat for at least partly housing the splicing device.

13. The hoisting assembly as claimed in claim 12, wherein the jaws are mounted to rotate about respective supporting arms, to allow the splicing device to pass between the jaws when the splicing device is drawn between the jaws in a second direction opposite the first direction.

14. The hoisting assembly as claimed in claim 10, wherein the coupling device comprises a further rope, which loops about the splicing device and is secured to the laying vessel.

15. The hoisting assembly as claimed in claim 10, wherein an open loop is formed about the pulley by the first rope when end-locked, and by the first and second ropes used jointly when the first rope is not end-locked; said open loop comprising first and second portions extending between the pulley and the laying vessel; and the hoisting assembly comprising spacer devices fittable selectively to the first and second portions.

16. The hoisting assembly as claimed in claim 15, wherein each spacer device comprises a first annular member which clamps onto the first portion; a second annular member which fits in a sliding manner onto the second portion; and a spacer connected to the first and second annular members.

17. A laying vessel for assembling and laying an underwater pipeline on the bed of a body of water; the laying vessel comprising the hoisting assembly as claimed in claim 10.

* * * * *